United States Patent
Sundström

[11] B 3,981,337
[45] Sept. 21, 1976

[54] KNIFE ASSEMBLY

[75] Inventor: Erik Wilhelm Sundström, Sandviken, Sweden

[73] Assignee: Sandvik Aktiebolag, Sandviken, Sweden

[22] Filed: Jan. 30, 1975

[21] Appl. No.: 545,630

[44] Published under the second Trial Voluntary Protest Program on January 27, 1976 as document No. B 545,630.

[30] Foreign Application Priority Data
Feb. 2, 1974  Sweden .............................. 7401608

[52] U.S. Cl. ................................ 144/241; 241/92; 241/296
[51] Int. Cl.[2] ......................................... B27G 13/00
[58] Field of Search ......... 144/218, 241, 230, 90 A; 241/292.1, 92, 296

[56] References Cited
UNITED STATES PATENTS
715,378  12/1902  Heath .................................. 144/230

FOREIGN PATENTS OR APPLICATIONS
220,880  4/1962  Austria ............................ 241/292.1

Primary Examiner—James L. Jones, Jr.
Attorney, Agent, or Firm—Pierce, Scheffler & Parker

[57] ABSTRACT

The knife assembly consists essentially of a relatively light two-edged cutting insert and a heavier holder. The insert is symmetrical about its longitudinal axis. In cross-section the two cutting edges of the insert represent the acute corners of a parallelogram, the obtuse corners of which are occupied by two longitudinal grooves that are hook-shaped in cross section. The holder includes a base plate having a projection complementary to either of said grooves. A clamping plate secures the insert on the base plate and binds said projection and said hook-like groove together. In the assembled knife the cutting edge of the insert is bounded by two plane surfaces one of which is flush with a plane surface on the holder and the other of which is flush with a plane surface on the clamping plate.

6 Claims, 3 Drawing Figures

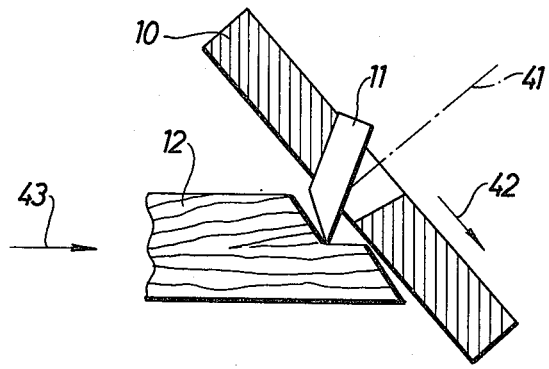
Fig.1
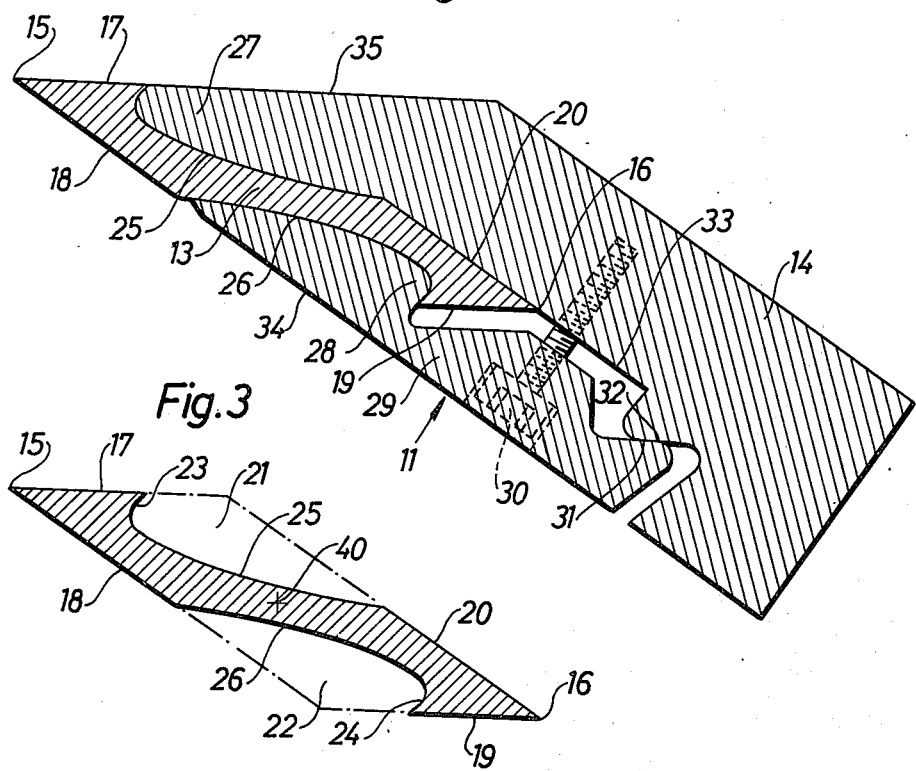
Fig.2
Fig.3

KNIFE ASSEMBLY

For a knife for heavy cutting as for instance cutting of wood chips it is required that the knife can take great pressure perpendicularly to the plane where the chips are cut off. It is also required that the knife has sufficient mechanical strength. Furthermore the knife should be smooth along the portions close to the cutting edge. These requirements have earlier been fulfilled by making the knife solid and heavy. This means however high costs for sharpening and exchange of knives.

According to the present invention there is proposed a knife consisting of a lighter cutting insert with cutting edges and a heavier holder which are shaped in such a way that the mentioned requirements are fulfilled. This means an economic saving in that the part which has to be replaced is substantially smaller than in conventional knives.

The invention is closer illustrated in the following specification with appended drawings showing:

FIG. 1, a schematical picture of a machine for wood chip cutting.

FIG. 2, on a larger scale a knife assembly forming part of the machine in FIG. 1.

FIG. 3, a cutting insert of the assembly in FIG. 2.

The machine shown in FIG. 1 comprises a rotor 10 in which are mounted one or more knives 11. The rotor rotates on the axis 41, the illustrated knife 11 moving in the direction 42, and during this rotation the work piece 12 is fed in the direction 43, so that the knife 11 cuts chips from the work piece.

In FIG. 2 the knife is shown on a larger scale in cross section perpendicular to the cutting edge 15. It forms an assembly consisting of a cutting insert 13 and a holder comprising support plate 14 and a clamping plate 29. The cutting insert is shown separately in FIG. 3 and has two parallel longitudinal cutting edges 15 and 16 and is symmetric on an axis 40 parallel with the cutting edges and situated centrally between them, so that the cutting insert has identical shape after turning 180° on said axis. The cutting edges are limited by side surface 17, 18 and 19, 20 which in cross section form the acute angle corners of a parallellogram. The cutting insert has two groove shaped recesses 21 and 22 situated so that they cut off the obtuse angle corners in the parallellogram the missing portions being marked with dot-dash lines. The recesses comprise each a smaller surface 23 and 24 which is substantially perpendicular to the opposite side in the parallellogram, and a larger surface 25 and 26 which is substantially parallel with the long diagonal of the parallellogram.

FIG. 2 shows the cutting insert mounted in the holder with the cutting edge 15 in cutting position. A projection 27 on the support plate 14 enters into the recess 21 on the insert and the cutting edge surface 20 rests on the surface 33 in the support part. A projection 28 on the clamping plate enters into the recess 22 of the insert. The clamping plate is tensioned by means of a screw 30. The rear end of the plate has a surface 31 abutting a surface 32, and said surfaces are inclined in such a way that when the screw 30 in tensioned and urges the plate 29 perpendicularly towards the surface 33 the plate 29 is also urged sideways in the direction along the surface 33 by the wedging action between the surfaces 31 and 32. The projections 27 and 28 are in hooked engagement with the surfaces 23 and 24 and exert a tension on the insert during said sideways movement on the plate 29. The insert 13 is thus clamped sideways by the tensioning action of the plate 29 and perpendicularly by the compressive action of the same plate.

The surface 17 on the insert is flush with the adjacent surface 35 on the support plate 14 and the surface 18 is flush with the adjacent surface 34 on the clamping plate, thus presenting smooth working surfaces facilitating the chip flow and the movement of the top along the work piece. The composite surfaces 17, 35 and 18, 34 are preferably substantially plane.

When the surface 18 is subjected to forces from the chip cutting there arise tensile stresses in the middle section of the insert 13 and purely compressive stresses in the part 27. This makes it possible to use material with lower mechanical strength in the holder.

FIG. 2 shows a chip knife on approximately the material scale. The rotor 10 in FIG. 1 is usually arranged to receive a number of knives having their cutting edges orientated substantially in the radial direction. The holders 14 may have a length of about 1 m each, the diameter of the rotor being 2 m. The inserts 13 may be of steel and have then usually the same length as the holders. The inserts may also be of sintered hard metal in which case they preferably are shorter than the holder and are equally long as wide, each holder being provided with a row of several inserts. Besides for wood chip cutting a knife of the kind described is suitable also for other similar operations as veneer cutting.

I claim:

1. Cutting insert for knife assembly, said insert having two longitudinal cutting edges (15, 16), the insert being symmetrical after turning on a longitudinal axis (40) for fastening in a holder (14, 29) and exposing one cutting edge at a time for cutting purposes, the cutting edges forming in cross section the acute corners of a parallellogram, the insert also having two longitudinal grooves (27, 28) occupying each of the two obtuse corners of said cross section each of said grooves having a hooked cross section in order to establish a hooked engagement between the cutting insert and the holder.

2. Holder for cutting insert in a knife assembly as defined in claim 1, said holder having a support plate (14) with a projection (27) entering into one of the grooves (21) in the cutting insert and a clamping plate (29) with a projection (28) entering into the other groove (22), clamping means (30) being provided for urging the clamping plate towards the base plate, exerting a pressing action on the insert, and at the same time urging the clamping plate sideways along the base plate so that the projections (27, 28) are urged apart, exerting a pulling action on the insert.

3. Holder a defined in claim 2 in which the means for urging the clamping plate towards the support plate is a clamping screw (30).

4. Holder as defined in claim 3 in which the means for urging the clamping plate sideways is an abutment contact between the clamping plate and the support plate with the abutting surfaces (31, 32) inclined in such a way that the clamping plate is urged sideways when the clamping screw (30) is tensioned.

5. Knife assembly consisting essentially of a cutting insert and a holder for the cutting insert, said insert having two longitudinal cutting edges (15, 16), the insert being symmetrical after turning on a longitudinal axis (40) for fastening in a holder (14, 29) and exposing one cutting edge at a time for cutting purposes, the cutting edges forming in cross section the acute corners of a parallellogram; the insert also having two longitudinal hook-shaped grooves (21, 22) occupying each of the two obtuse corners of said cross section, and said holder having a support plate (14) with a projection (27) entering into one of the hook-shaped grooves (21) in the cutting insert and a clamping plate (29) with a projection (28) entering into the other groove (22), clamping means (30) being provided for urging the clamping plate towards the support plate, exerting a pressing action on the insert, and at the same time urging the clamping plate sideways along the support plate so that the projections (27, 28) are urged apart, exerting a pulling action on the insert, the assembly being further characterized in that the cutting edge surfaces (17, 18) adjacent said cutting edges (15, 16) on the cutting insert are flush with adjacent surfaces (34, 35) on said holder.

6. Knife assembly as defined in claim 5, in which the composite surfaces (17, 35 and 18, 34) are substantially plane.

* * * * *

UNITED STATES PATENT OFFICE
CERTIFICATE OF CORRECTION

PATENT NO. : 3,981,337
DATED : September 21, 1976
INVENTOR(S) : ERIK WILHELM SUNDSTROM It is certified that error appears in the above-identified patent and that said Letters Patent are hereby corrected as shown below:

In Claim 2, lines 7 and 9

"base" should read: support

Signed and Sealed this

Ninth Day of November 1976

[SEAL]

Attest:

RUTH C. MASON
Attesting Officer

C. MARSHALL DANN
Commissioner of Patents and Trademarks